US012382000B2

(12) United States Patent
Chen

(10) Patent No.: US 12,382,000 B2
(45) Date of Patent: Aug. 5, 2025

(54) REMOTE MANAGEMENT OF VIDEOCONFERENCING APPLICATIONS

(71) Applicant: Zoom Video Communications, Inc., San Jose, CA (US)

(72) Inventor: Tania Sung-Yi Chen, Cupertino, CA (US)

(73) Assignee: Zoom Communications, Inc., San Jose, CA (US)

( * ) Notice: Subject to any disclaimer, the term of this patent is extended or adjusted under 35 U.S.C. 154(b) by 303 days.

(21) Appl. No.: 18/102,205

(22) Filed: Jan. 27, 2023

(65) Prior Publication Data

US 2024/0259527 A1 Aug. 1, 2024

(51) Int. Cl.
 *H04N 7/15* (2006.01)
 *H04L 51/046* (2022.01)
 *H04M 3/56* (2006.01)

(52) U.S. Cl.
 CPC ........... *H04N 7/157* (2013.01); *H04L 51/046* (2013.01); *H04M 3/565* (2013.01); *H04N 7/152* (2013.01)

(58) Field of Classification Search
 CPC ............... H04L 12/1822; H04L 65/403; H04L 12/1818; H04L 51/046; H04L 63/102; H04L 63/20; H04N 7/15; H04N 7/152; H04N 7/157; H04M 3/565
 See application file for complete search history.

(56) References Cited

U.S. PATENT DOCUMENTS

| | | | |
|---|---|---|---|
| 11,317,059 B1* | 4/2022 | Lanatta | H04L 65/1089 |
| 2011/0063407 A1* | 3/2011 | Wang | H04N 21/454 |
| | | | 348/E7.083 |
| 2011/0209193 A1* | 8/2011 | Kennedy | G06F 21/55 |
| | | | 726/1 |
| 2019/0149347 A1* | 5/2019 | Mcardle | H04W 12/06 |
| | | | 709/204 |
| 2019/0342406 A1* | 11/2019 | Borden | H04L 67/535 |
| 2020/0145616 A1* | 5/2020 | Nassar | G06F 9/45533 |
| 2022/0124286 A1* | 4/2022 | Punwani | H04L 65/1069 |
| 2022/0209976 A1* | 6/2022 | Martin | H04L 63/102 |
| 2022/0210371 A1* | 6/2022 | Adcock | H04N 7/155 |
| 2022/0247587 A1* | 8/2022 | Rolin | H04L 12/1818 |
| 2022/0353308 A1* | 11/2022 | Han | H04L 12/1822 |

* cited by examiner

*Primary Examiner* — Yogeshkumar Patel
(74) *Attorney, Agent, or Firm* — Kilpatrick Townsend & Stockton, LLP

(57) ABSTRACT

One example method for providing remote management of videoconferencing applications includes receiving, by a computing device, from a first client device, a first indication to generate a first policy, wherein the first policy comprises one or more conditions relating to a first application and one or more actions to be taken. The computing device may receive one or more indications associated with the first application and determine, based on the one or more indications, whether any of the one or more conditions has occurred. The computing device may, responsive to determining that a first condition of the one or more conditions has occurred, cause one or more actions corresponding to the first condition to be executed.

20 Claims, 7 Drawing Sheets

REMOTE MANAGEMENT OF VIDEOCONFERENCING APPLICATIONS

FIELD

The present application generally relates to videoconferences, chat channels, and calendars, and more particularly relates to systems and methods for remote management of videoconferencing applications.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION

Figure 1:
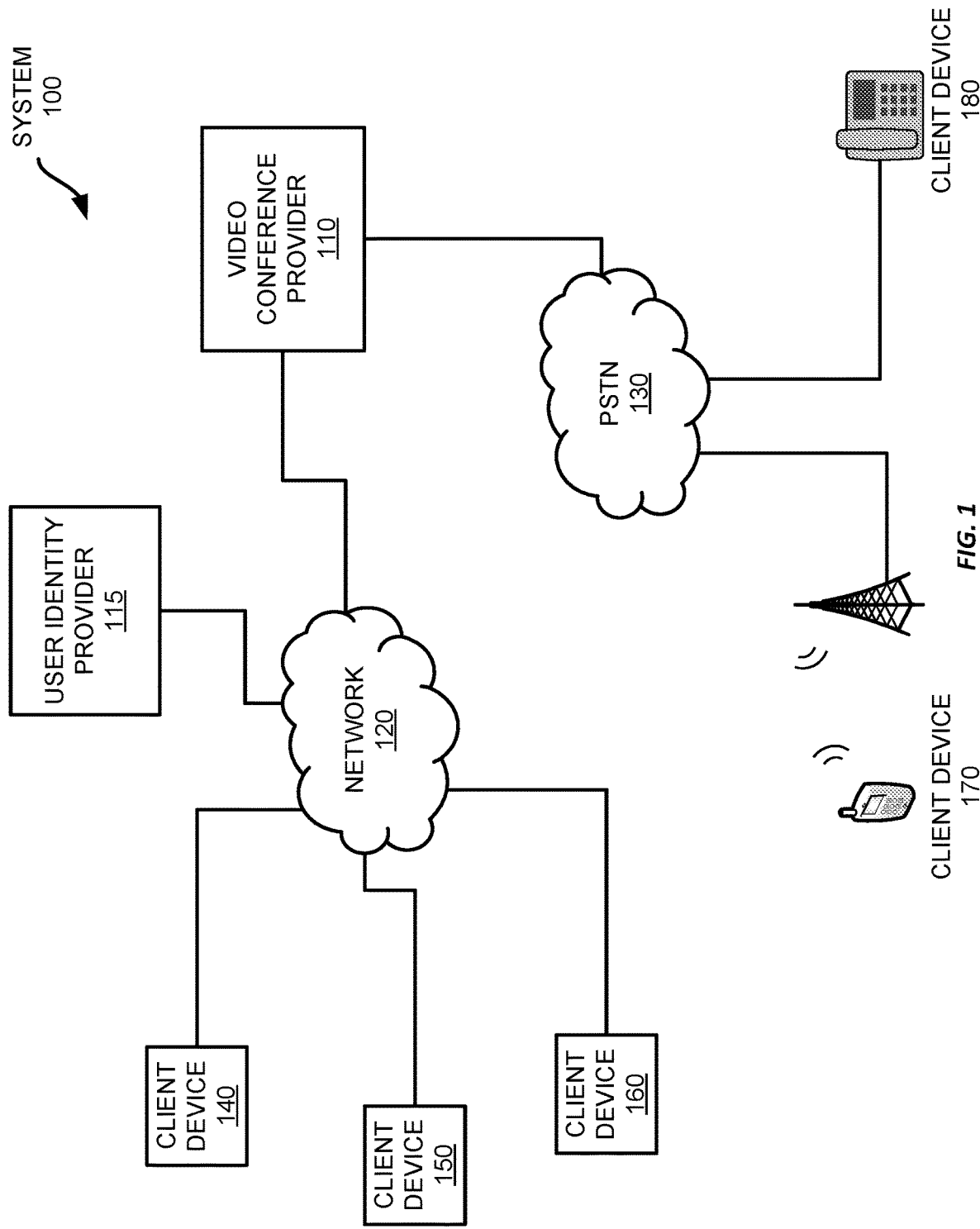
FIG. 1 shows an example system that provides videoconferencing functionality to various client devices.

Examples are described herein in the context of systems and methods for remote management of videoconferencing applications. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Modern videoconferencing applications can bring together many types of digital communications, effectively becoming communication hubs. Some videoconferencing applications may include additional applications such as chat messaging, video conferencing, and calendaring. While each additional application may subsume a particular domain of communications, a common set of difficulties plague users of these videoconferencing applications.

An example application found in some videoconferencing applications is chat messaging. For instance, chat messaging involves a chat channel that allows multiple participants to exchange chat messages, including sharing documents, text messages, audio clips, etc., with other members of the chat channel. Unlike email communication, however, a chat channel generates a running dialogue of chat messages that are exchanged within the chat channel. As such, chat channels can accumulate thousands of chat messages, especially if the chat channel involves a high number of members or if a member is a participant of many chat channels. The result may be a user interface cluttered with high unread message counts, abandoned channels, missed messages, and similar frustrations.

Examples of systems and methods for remote management of videoconferencing applications are provided that may allow for quick and efficient remote management of chat channels. A client device may include one or more chat channels. A chat channel may be remotely managed using one or more policies. Policies may correspond to management tasks that may be taken in the context of a chat channel. For instance, one situation might include a chat channel that has become inactive. A chat channel member could wait a specified amount of time and then hide the channel from the user interface. For example, a chat channel member could hide all channels that have been inactive for 120 days or more. Many chat channel members, however, are part of numerous chat channels and monitoring chat channels for inactivity may become cumbersome or time-consuming. As such, chat channel members often forget about inactive chat channels or don't have the time resources to hide inactive channels.

To allow for efficient remote management of chat channels, a policy can be created for remote management of the chat channel. Specifically, a policy may be generated that includes a condition (e.g., "inactivity of a chat channel") and a subsequent action (e.g., "hiding of the chat channel"). Following the above example, the policy may include the condition that specifies that the chat channel be inactive for 120 days. The condition may be represented using an example representation as "IF [channel][inactive][>][120][days]." The policy may include the subsequent action to be taken upon the occurrence of the condition. In this example, the action includes hiding the chat channel from the user interface. The action may be represented using an example representation as "THEN [move it to HIDE]." This policy can be deployed to a remote video conference provider that includes a policies engine.

When the channel has been inactive for more than 120 days, the chat application can send an indication of the inactivity to the remote video conference provider. The indication may include data that maps to the inactivity specified in the condition including, for example, the timestamp of the last message sent on the chat channel. The policies engine can determine that the condition has occurred and relay an instruction to the client device which may cause the chat channel to hide the channel from the user interface.

In some implementations, the video conference provider can remotely determine the inactivity of the chat channel. The video conference provider can provide an indication of the inactivity to the policies engine. The policies engine can determine that the condition has occurred and relay an instruction to the client device. The instruction may cause the client device to create a notification to ask the user of the client device to confirm whether the action associated with the condition should be taken. In the present example, the user may receive a notification that contains text indicating that a particular chat channel has been inactive for more than 120 days and specifying that the channel will be hidden upon receipt of user confirmation or authorization of the action.

Another example application provided by some virtual conference providers is video conferencing. In video conferencing, participants may interact with each other using their own computers (or "client devices") with both video and audio in a variety of settings, such as in one-on-one conversations, group meetings, and webinars. Video conference participants may participate in large numbers of video conferences and have many scheduled conferences. Video conferences may be of significant duration and have varying requirements for recording, translating, or archiving. As a result, busy video conference schedules may be difficult to manage, and important tasks may be missed.

Examples of systems and methods for remote management of videoconferencing applications are provided that may allow for efficient remote management of video conferences. A video conference may be remotely managed using one or more policies. Policies may correspond to management tasks that may be taken in the context of a video conference. For instance, one situation might include a video conference that the participants wish to record. Participants may rely on memory to ensure a recording is made. A policy may be generated for remote management of the video conference that includes this condition and a subsequent action. In this example, the policy may include the condition that specifies that the video conference has been in progress for 5 minutes. The condition may be represented in an example representation as "IF [video conference][started]—[>] [5][minutes ago] + [video conference] [NOT] [recording]." The policy may include the subsequent action to be taken upon the occurrence of the condition. As shown in this example, the condition may be a compound condition including a plurality of conditions. In this example, the action includes providing the participants with a reminder to start a recording. The action may be represented in an example representation as "THEN [remind] [me] ['Do you want to record this meeting?']." This policy can be deployed to a remote video conference provider, which includes the policies engine.

When the video conference has been running for more than 5 minutes and is not being recorded, the videoconferencing application can send an indication of the recording status to the remote video conference provider. The indication may include data that maps to the start time specified in the condition including, for example, the time the video meeting started. The policies engine can determine that the condition has occurred and relay an instruction to the client device which may cause the video conference to remind the participant with a customized reminder asking them if they want to record the meeting.

Another example application provided in some videoconferencing applications is a calendaring application. As virtual conferencing has become a typical part of modern workflows, workplace calendars are filled with video conferences, meetings, lunches, and the like. Moreover, calendars are routinely linked with third-party calendar providers, adding additional clutter and noise to the calendar maintained by the virtual conference provider. Performing routine administrative tasks with respect to the calendar may become difficult for calendar users to manage as the number of scheduled events and calendars grows.

Examples of systems and methods for remote management of videoconferencing applications are provided that may allow for efficient, remote management of calendars. Policies may correspond to management tasks that may be taken in the context of a calendar. For instance, one situation might include a calendar containing a scheduled event with several invitees. One or more invitees may update their own calendar with an indication that they will be unavailable during the scheduled event. For example, the invitee may schedule an "out of office" period that overlaps with the scheduled event. The scheduler of the scheduled event may not receive any notification or may have to periodically check to ensure that all invitees can still attend resulting in a poor user experience. A policy may be generated for remote management of the calendar that includes this condition and a subsequent action. In this example, the policy may include the condition that specifies that the calendar contains a scheduled event with an invitee that has an "out of office" status. The condition may be represented in an example representation as "IF [calendar event] [has] [invitee] [with status] IS [out of office]." The policy may include the subsequent action to be taken upon the occurrence of the condition. In this example, the action includes providing the calendar user with a notification that an invitee has "out of office" status during the scheduled event and/or to recommend the scheduled event be rescheduled. The action may be represented in an example representation as "THEN [notify] [me] ['Invitee is out of office during meeting, consider rescheduling.']."

With this policy selected, when a scheduled event has an invitee who has set "out of office" status for a period that overlaps with the scheduled event, the user will receive a notification indicating that an invitee will be out of office during the scheduled event. This policy can be deployed to a remote video conference provider, which includes the policies engine. When a scheduled event with one or more invitees is created using a client device, the client device can send an indication of the scheduled event and the designated invitees to the remote video conference provider. The indication may include data that maps to properties specified in the condition including, for example, the start and stop time of the scheduled event and the identities of the invitees.

In some examples, the video conference provider may have additional data needed for resolving the condition including, in this example, the invitees' calendars, statuses, or replies/RSVPs to meeting invitations. Using the data provided by the client device and the data about the invitees, the policies engine can determine that the condition has occurred and relay an instruction to the client device which may cause the calendar to notify the calendar user that an invitee will be out of office during the scheduled event.

Other example policies may be created for remote management of the calendaring application. For example, a policy can be created that will send a notification to the creator of a scheduled event if specified invitees respond in certain ways. An invitee may initially indicate an intent to attend the event, but later indicate an intent not to attend the event. A policy may specify that the creator of the event should be notified if specified invitees indicate an intent not to attend the event so that the event may be rescheduled. Another example might include a calendar containing multiple scheduled events that inadvertently overlap in time. A policy can be created that specifies that when two or more overlapping calendar events are detected, the user should receive a notification indicating that two overlapping events have been detected on the user's calendar so that the conflict can be resolved.

These illustrative examples are given to introduce the reader to the general subject matter discussed herein and the disclosure is not limited to this example. The following sections describe various additional non-limiting examples and examples of systems and methods for remote management of videoconferencing applications.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the chat and video conference provider 110. For example, the chat and video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the chat and video conference provider 110 over a public network.

The system optionally also includes one or more user identity providers, e.g., user identity provider 115, which can provide user identity services to users of the client devices 140-160 and may authenticate user identities of one or more users to the chat and video conference provider 110. In this example, the user identity provider 115 is operated by a different entity than the chat and video conference provider 110, though in some examples, they may be the same entity.

Figure 2:
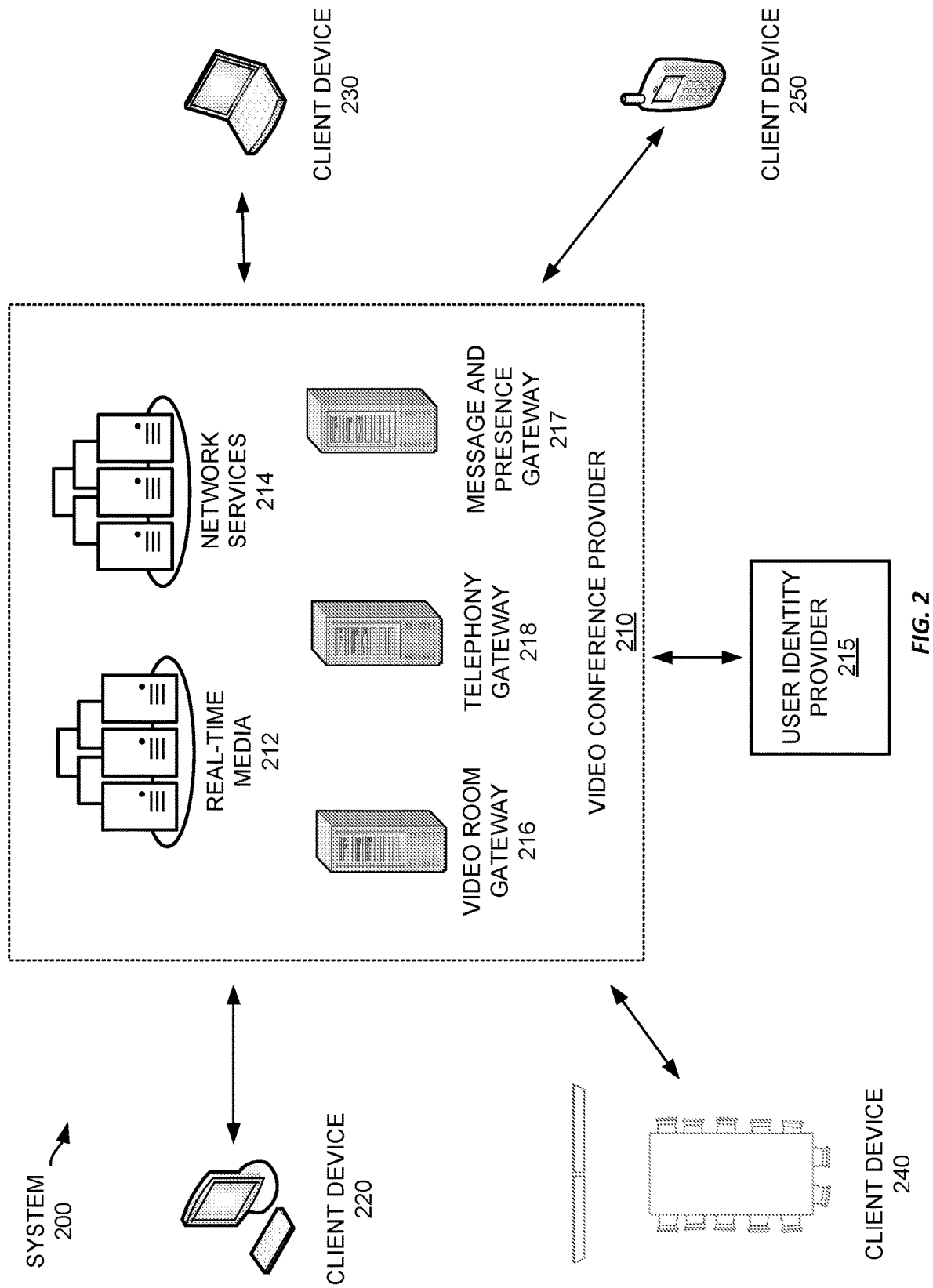
FIG. 2 shows an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, manage user functionality in the meetings, enable text messaging during the meetings, create and manage breakout rooms from the virtual meeting, etc. FIG. 2, described below, provides a more detailed description of the architecture and functionality of the chat and video conference provider 110. It should be understood that the term "meeting" encompasses the term "webinar" used herein.

Meetings in this example video conference provider 110 are provided in virtual rooms to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used.

To create a meeting with the chat and video conference provider 110, a user may contact the chat and video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the chat and video conference provider 110 may prompt the user for certain information, such as a date, time, and duration for the meeting, a number of participants, a type of encryption to use, whether the meeting is confidential or open to the public, etc. After receiving the various meeting settings, the chat and video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating that the meeting has not yet started or the host may be required to specifically admit one or more of the users.

During the meeting, the participants may employ their client devices 140-180 to capture audio or video information and stream that information to the chat and video conference provider 110. They also receive audio or video information from the chat and video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting, and they will no longer receive audio or video streams for the meeting (and will stop transmitting audio or video streams). The chat and video conference provider 110 may also invalidate the meeting information, such as the meeting identifier or password/passcode.

To provide such functionality, one or more client devices 140-180 may communicate with the chat and video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the chat and video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the chat and video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the chat and video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the chat and video conference provider 110 using network 120 and may provide information to the chat and video conference provider 110 to access functionality provided by the chat and video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the chat and video conference provider 110.

A user identity provider 115 may be any entity trusted by the chat and video conference provider 110 that can help identify a user to the chat and video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the chat and video conference provider 110.

When the user accesses the chat and video conference provider 110 using a client device, the chat and video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the chat and video conference provider 110 either provides or denies access to its services, respectively.

For telephony devices, e.g., client devices 170-180, the user may place a telephone call to the chat and video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the chat and video conference provider 110. For example, telephony devices may be unable to provide user identification information to identify the telephony device or the user to the chat and video conference provider 110. Thus, the chat and video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the chat and video conference provider 110, even in cases where the user has an authenticated identity and employs a client device capable of identifying the user to the chat and video conference provider 110. The chat and video conference provider 110 may determine whether to allow such anonymous users to use services provided by the chat and video conference provider 110. Anonymous users, regardless of the reason for anonymity, may be restricted as discussed above with respect to users employing telephony devices, and in some cases may be prevented from accessing certain meetings or other services, or may be entirely prevented from accessing the chat and video conference provider 110.

Referring again to video conference provider 110, in some examples, it may allow client devices 140-160 to encrypt their respective video and audio streams to help improve privacy in their meetings. Encryption may be provided between the client devices 140-160 and the chat and video conference provider 110 or it may be provided in an end-to-end property where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the chat and video conference provider 110, while allowing the chat and video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus, the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the chat and video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the chat and video conference provider 210 over a communications network, such as the internet for client devices 220-240 or the PSTN for client device 250, generally as described above with respect to FIG. 1. The chat and video conference provider 210 is also in communication with one or more user identity providers 215, which can authenticate various users to the chat and video conference provider 210 generally as described above with respect to FIG. 1.

In this example, the chat and video conference provider 210 employs multiple different servers (or groups of servers) to provide different aspects of video conference functionality, thereby enabling the various client devices to create and participate in video conference meetings. The chat and video conference provider 210 uses one or more real-time media servers 212, one or more network services servers 214, one or more video room gateways 216, one or more message and presence gateways 217, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the chat and video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead, each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the chat and video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the chat and video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the chat and video conference provider 210 may allow a meeting participant to notify it of inappropriate behavior or content in a meeting. Such a notification may trigger the real-time media servers to 212 record a portion of the meeting for review by the chat and video conference provider 210. Still other functionality may be implemented to take actions based on the decrypted multimedia streams at the chat and video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the chat and video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the chat and video conference provider under a supervisory set of servers. When a client device 220-250 accesses the chat and video conference provider 210, it will typically communicate with one or more network services servers 214 to access their account or to participate in a meeting.

When a client device 220-250 first contacts the chat and video conference provider 210 in this example, it is routed to a network services server 214. The client device may then provide access credentials for a user, e.g., a username and password or single sign-on credentials, to gain authenticated access to the chat and video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the chat and video conference provider 210, or scheduling a new meeting, by interacting with the network services servers 214.

In some examples, users may access the chat and video conference provider 210 anonymously. When communicating anonymously, a client device 220-250 may communicate with one or more network services servers 214 but only provide information to create or join a meeting, depending on what features the chat and video conference provider allows for anonymous users. For example, an anonymous user may access the chat and video conference provider using client device 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to remove one or more participants from a meeting, such a command may also be handled by a network services server 214, which may terminate the authorization of the one or more participants for joining the meeting.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the chat and video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the chat and video conference provider 210. For example, the video conferencing hardware may be provided by the chat and video conference provider to one or more of its subscribers, which may provide access credentials to the video conferencing hardware to use to connect to the chat and video conference provider 210.

The video room gateway servers 216 provide specialized authentication and communication with the dedicated video conferencing hardware that may not be available to other client devices 220-230, 250. For example, the video conferencing hardware may register with the chat and video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the chat and video conference provider 210.

Referring now to the telephony gateway servers 218, these servers 218 enable and facilitate telephony devices' participation in meetings hosed by the chat and video conference provider 210. Because telephony devices communicate using the PSTN and not using computer networking protocols, such as TCP/IP, the telephony gateway servers 218 act as an interface that converts between the PSTN, and the networking system used by the chat and video conference provider 210.

For example, if a user uses a telephony device to connect to a meeting, they may dial a phone number corresponding to one of the chat and video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server is instead joined to the meeting on the telephony device's behalf.

After joining the meeting, the telephony gateway server 218 receives an audio stream from the telephony device and provides it to the corresponding real-time media server 212 and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the chat and video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

In some examples, in addition to the video conferencing functionality described above, the chat and video conference provider 210 (or the chat and video conference provider 110) may provide a chat functionality. Chat functionality may be implemented using a message and presence protocol and coordinated by way of a message and presence gateway 217. In such examples, the chat and video conference provider 210 may allow a user to create one or more chat channels where the user may exchange messages with other users (e.g., members) that have access to the chat channel(s). The messages may include text, image files, video files, or other files. In some examples, a chat channel may be "open," meaning that any user may access the chat channel. In other examples, the chat channel may require that a user be granted permission to access the chat channel. The chat and video conference provider 210 may provide permission to a user and/or an owner of the chat channel may provide permission to the user. Furthermore, there may be any number of members permitted in the chat channel.

Similar to the formation of a meeting, a chat channel may be provided by a server where messages exchanged between members of the chat channel are received and then directed to respective client devices. For example, if the client devices 220-250 are part of the same chat channel, messages may be exchanged between the client devices 220-240 via the chat and video conference provider 210 in a manner similar to how a meeting is hosted by the chat and video conference provider 210.

Figure 3:
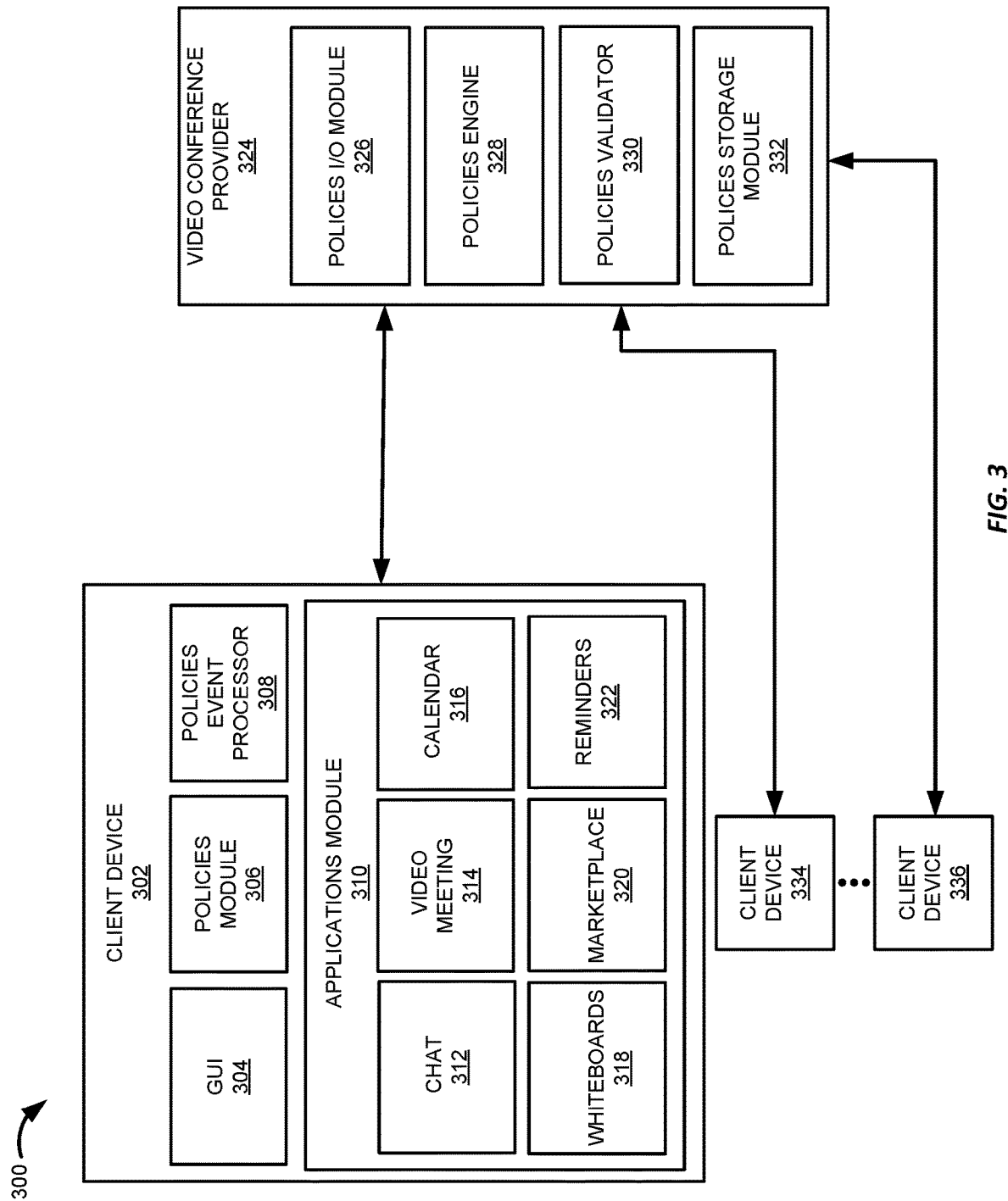
FIG. 3 shows an example system for remote management of videoconferencing applications, according to some aspects of the present disclosure.

Referring now to FIG. 3, FIG. 3 shows an example system 300 for remote management of videoconferencing applications, according to some aspects of the present disclosure. One or more client devices 302, 334, and 336 may be communicatively coupled with a video conference provider 324. The client device 302 may be a personal computer, laptop, smartphone, tablet, or similar device. The modules making up the client device 302 and the video conference provider 324 described herein may be implemented as hardware, software, or both. In some examples, some modules included in example system 300 may be hosted in other devices or remote servers, including cloud service providers. The client device may be controlled by way of a graphical user interface (GUI) 304. The GUI 304 may be displayed on a personal computer screen, smartphone screen, tablet screen, or the like.

The client device may include an applications module 310 which hosts a suite of applications available to a user of the client device 302. For example, one application may be a chat application 312. Other examples include a video meeting application 314, a calendar application 316, a whiteboards application 318, a marketplace application 320, and a reminders application 322. This list is non-limiting and other applications are possible. For instance, the marketplace application 320 may allow for the installation of any number of third-party applications. Other applications may also include an email application or an SMS/text message application. Any of these possible applications may be the subject of policies for remote management of videoconferencing applications.

The applications of the applications module 310 may include a variety of functions. Policy actions may include as actions one or more functions of the applications. For example, a new chat channel can be created in the chat application 312, a video meeting may be started in the video meeting application 314, or a new appointment may be added to the calendar application 316. The functions of an application may be exposed by an API provided by the client device 302 or of the application itself. In addition to the applications of the applications module 310, other client devices 334 and 336, or the video conference provider 324 may provide the subject matter of policy actions. Policy actions may also include functions of the client device 302. Functions of the client device 302 may include volume adjustments, display adjustments, network settings changes, and others.

In some example calendar applications, one or more electronic calendar providers may be connected to the network 120 to enable various client devices 302, 334, and 336 to access electronic calendars for their respective users. The client device 302 also has access to the user's own electronic calendar, such as by using an application programming interface ("API") or other messaging mechanism. In addition, the client device 302 is able to request calendar information from other meeting participants and provide meeting information to the other meeting participants or the video conference provider 324 to schedule a new meeting. It also can receive calendar information from the other participants, such as by accessing their electronic calendars directly, such as by accessing a corporate email or calendar application, obtaining information from the participants through manual input of free blocks of time, or by communicating with a third-party electronic calendar provider.

In some examples, the applications of the applications module 310 may include a variety of data. For example, a new chat channel can have a name, a video conference can have a start time, or a new appointment may have a location. The data may correspond to the properties making up the conditions of policies. Data may be retrieved through or pushed by an API of an application or the client device 302 to the video conference provider 324 for policy evaluation. Data may also be available through system calls, external APIs or web applications, property files, system properties, volatile memory, or any other suitable location.

The client device 302 may include a policies module 306. A user of the client device 302 may use the policies module 306 to create, view, modify, or delete policies. The policies module 306 may be operated using the GUI 304, but other modes of operating the policies module 306 are possible. For instance, the policies module 306 may be accessed using an API and thereby coupled with other applications running on the client device 302. In this example, a third-party application downloaded from the marketplace application 320 could access the policies module 306 to automatically create new policies pertaining to itself or other applications. In some examples, the policies module 306 maintains a copy of the policies associated with the client device 302 retrieved from the video conference provider 324. In this way, the policies module 306 can perform a storage function. However, the policies themselves are not necessarily stored in the policies module 306. A separate memory device may be used for local storage of the policies on the client device 302. For instance, the policies may be stored in RAM or solely by the video conference provider 324.

The policies module 306 may allow for the creation of new policies. Upon creation of a new policy, the new policy may be added to the local copy of the client device's policies, and it may be transferred to the video conference provider 324 for processing. The video conference provider 324 may first require the client device 302 to authenticate before performing policy operations. Authentication may utilize username/password-based authentication, OAuth, or other authentication technology, or a third-party identity provider. Alternatively, the client device 302 may conduct policy operations using an API provided by the video conference provider 324. For example, a user may create a new policy using a GUI 304 provided by the policies module 306. The policies module 306 may also perform some validation of policy syntax and semantic validity. The user of the client device 302 may be informed through a suitable GUI that the policy cannot be stored due to invalid syntax or lack of semantic sense.

The policies module 306 may also provide for the viewing of existing policies. The policies module 306 may provide a user interface for browsing, searching, or sorting policies, among other functions, via the GUI 304. The policies module 306 may also provide for the updating of existing policies. In that case, a GUI 304 similar to the one used for creation of policies described above, may be used. The policies module 306 may also provide for the deletion or inactivation of policies. A deleted policy may be removed from local storage and the remote policies storage module 332, whereas an inactivated one may not be deleted, but is not acted upon. In the case of an inactivated policy, the conditions may not be checked for occurrence, or the actions may not be executed upon occurrence of the conditions.

The policies module 306 may provide processes for the deconfliction of conflicting policies. For instance, if a first policy describes a particular action for a condition and a second policy describes a different action for the same condition, a deconfliction process might execute only the action that was created first. Other schemes are possible. For example, both actions may be executed in sequence or substantially simultaneously. In other examples, actions may be executed according to a priority scheme.

The client device 302 may include a policies event processor 308. In some examples, the video conference provider 324, upon detection that a condition has occurred, may send an event message to the client device 302 with data corresponding to the execution of the action(s) corresponding to that condition. The policies event processor 308 may receive data from the video conference provider 324 and execute the actions corresponding to the conditions that have occurred. For example, if policies engine 328 of the video conference provider 324 determines that the condition in the policy "IF [channel][inactive] [>] [120][days] THEN [move it to HIDE]" has occurred, then it may send data to the policies event processor 308 indicating which policy condition has occurred, and which action to take. In this example, the action "move it to HIDE" may be an instruction for the policies event processor 308 to access the chat application 312, identify the chat channel that is the subject of the condition, and move the chat channel to a hidden status. The data processed by the policies event processor may be a message in the form of, for example, JSON or XML data. Alternatively, it may take the form of a method call or description of the action to be taken in a domain-specific language (DSL), among other possibilities.

The policies event processor 308 may, in some examples, generate customized subscriptions for the client device 302 associated with one or more policies. The subscriptions may be implemented, for instance, using webhooks. For example, upon creation or update of a policy by the policies module 306, the policies event processor 308 may create a webhook associated with the policy. The webhook may be a URL containing parameters that identify the client device 302, a user of the client device (e.g., a user email), one or more policies, or other parameters. The policies event processor 308 can set the URL as the event notification endpoint for each event subscription. The video conference provider 324, upon detection that a condition has occurred, may send a web request to the URL of the webhook with data corresponding to the execution of the action(s) corresponding to that condition. The data may be received at the URL of the webhook provided by the policies event processor 308. The policies event processor 308 can cause the execution of the actions corresponding to the conditions that have occurred. In some examples, the client device 302 can provide the option to only receive webhook notifications for specified policies. For instance, while a plurality of policies may be associated with a particular client device, it may be possible to disable notifications from one or more policies. Policies may be disabled by deleting or ignoring data received at one or more associated webhooks.

The policies event processor 308 may include a queueing mechanism for scheduling the actions from the video conference provider 324. The policies event processor 308 may be communicatively coupled with the applications of the client device 302 in any suitable fashion. For example, the policies event processor 308, upon receiving data specifying an action for some component of the client device 302, may publish the event to a message queue for which the component is a subscriber. Other configurations coordinating the policies event processor 308 and the components of the client device 302 are also possible. In some examples, the policies event processor 308 may determine if one or more conditions have occurred without input from the video conference provider 324. For instance, a policy may include conditions that are local to the client device 302 and may therefore be resolved independently of the video conference provider 324.

In some examples, the policies event processor 308 can create and maintain an event log corresponding to the actions from the video conference provider 324. Actions taken or instructions to perform actions by the client device 302 may be recorded. The event log may reside in volatile memory or on a non-transitory memory medium like a hard disk drive. In some examples, the event log can be sent to the video conference provider 324 for permanent storage. In some cases, a user of the client device 302 may not be logged in when instructions to perform an action are received from the video conference provider 324. The client device 302 may execute the action according to the instructions provided by the policies event processor 308, despite the user not being logged in, and record the execution to the event log. The user of the client device 302 may then receive notification of the action at a later time by viewing the event log.

In some examples, a policy may be configured with an action that may not execute without affirmative confirmation from the user. The policies event processor 308 may, upon receiving data specifying an action for some component of the client device 302, determine whether the configuration of the action requires affirmative confirmation before executing the action. The policies event processor 308 may cause the GUI 304 to present the user with, for example, a dialog box describing the policy, the satisfied condition, and the action, and require the user to, for example, click a "Confirm" button before executing the action. In the event that the user cancels the action, or otherwise declines to confirm, the action may be discarded or deferred to another time ("snoozed"), in addition to other possible dispositions.

Turning next to the video conference provider 324, the video conference provider 324 may be similar to the video conference provider 110, 210 described in FIGS. 1 and 2. The video conference provider 324 shown in example system 300 contains components that may implement the remote management of videoconferencing applications. The components of the video conference provider 324 may be implemented as hardware, software, or both. In some examples, some modules included in the video conference provider 324 may be hosted in other devices or remote servers. In some examples, the components of the video conference provider 324 may be long-running processes or daemons. In some examples, the components of the video conference provider 324 may be implemented as microservices. A microservice may be a small, functional submodule of a larger application that is communicatively coupled with other submodules of the application using, for example, an API. Implementing the components of the video conference provider 324 as microservices to handle the logic, monitoring, detection, and execution of remote management of videoconferencing applications may have a significant performance impact and lead to enhanced efficiency.

The video conference provider 324 may include a policies I/O module 326. Client devices 302, 334, and 336 may establish communications with the video conference provider 324 for the coordination of applications like a chat application 312, a video meeting application 314, and a calendar application 316 among and between other client devices 302, 334, and 336. Policies that correspond to any of these applications may be created, viewed, updated, or deleted by the client devices 302, 334, and 336. Upon creating, retrieving, updating, or deleting a policy, the policies module 306 of the client device 302 may send an indication corresponding to the policy to the policies I/O module 326 of the video conference provider 324. For example, the indication may include data corresponding to the properties making the conditions in the policy. The data may be a message in the form of, for example, JSON or XML data. In some examples, the policies module 306 may transmit a data message to the policies I/O module 326. In another example, the policies module 306 may request a list of all policies for the client device 302 from the policies I/O module 326. Other operations are possible. In effect, the policies I/O module 326 is a gateway between the policies module 306 of the client devices 302, 334, and 336 and the policies engine 328 and policies storage module 332 of the video conference provider 324, as discussed in more detail below. The policies I/O module 326 may include numerous connections with different client devices 302, 334, and 336 simultaneously, for example, using sockets or a web application.

The video conference provider 324 may include a policies engine 328. The policies engine 328 checks for the occurrence of conditions in policies, using indications received from the client device 302. The indications may include data received from the policies module 306 in the client device 302 such as data associated with the applications in the applications module 310 or other functions of the client device 302. Data may be retrieved through or pushed by an API of the client device 302 or other application to the video conference provider 324. Data may also be available through system calls, external APIs or web applications, property files, system properties, volatile memory, or any other suitable location. The data may be sent to the video conference provider 324 as part of normal operations of the client device 302 and used by the policies engine 328 only incidentally. The data may be sent to the video conference provider 324 in any suitable machine-readable format including, for example, JSON or XML formats and stored by the video conference provider 324 in a database, data lake, or other memory device.

The indications may include data received by the video conference provider 324 from other client devices 334 and 336. For instance, the video conference provider 324 may collect and store data associated with a virtual meeting among multiple client devices 302, 334, and 336. Such data may be available, via the video conference provider 324, to the policies engine 328 to check whether the conditions of the policies associated with the client devices 302, 334, and 336 have occurred.

The policies engine 328 may include a component that periodically checks for the occurrence of conditions. For instance, the policies engine 328 may iterate over all conditions and check for the occurrence of those conditions. In another example, the policies engine 328 may include an event-based framework, in which conditions including properties from particular applications are checked for occurrence upon the triggering of certain events. For instance, the sending of a chat message, ending of a video conference, or creation of a new calendar appointment are examples of events that may trigger the policies engine 328 to check for the occurrence of conditions that include properties from the associated applications. Other policies engine 328 implementations are possible as well.

The policies engine 328 may include a component that dispatches messages to the policies I/O module 326 for transmission to the policy event processor 308 of the client device 302. The messages may contain data indicating actions to be performed on the client device 302 in accordance with associated conditions whose occurrence has been detected. The data may be derived, for example, from the DSL specifying the action or it may take the form of method calls from a programming language, remote procedure calls, or a similar invocation scheme. In some examples, the policies engine 328 may determine that a condition has occurred on a client device 302 and subsequently dispatch messages to cause actions on different client devices 334 and 336.

The video conference provider 324 may include a policies validator 330. When the policies I/O module 326 receives a new or modified policy, the policies validator 330 may be used to check the syntactic and semantic validity of said policy. Syntactic validation checks whether the policy is properly formatted according to predefined policies. This type of validation may prevent errors in the policies engine 328 while processing policies because of syntax errors due to, for instance, in the DSL used to represent a policy. This situation could be reflective of an error in the program code in the client device 302 used to create and transmit new policies to the video conference provider 324. For instance, given the policy "THEN [channel][inactive] [>] [120][days] THEN [move it to HIDE]" the policies validator 330 may detect that the "THEN" keyword is used twice, which is a syntax error. The policies validator 330 may then communicate data to the policies I/O module 326 containing details of the syntax error for transmission back to the policies module 306 of the client device 302.

The policies validator 330 may also perform semantic validation. This type of validation exists to ensure that, among other things, policies conform to the business logic of the video conference provider 324. For instance, given the policy "IF [channel][inactive] [>] [120][days] THEN [end video conference for all]" may cause the policies validator 330 to detect that the condition, relating to video conferences, has no related context in the action, relating to a chat channel, which is a semantic error. In other words, the condition refers to a particular chat channel while the action refers to a particular video conference, which has no antecedent. The policies validator 330 may then communicate data to the policies I/O module 326 containing details of the semantic error for transmission back to the policies module 306 of the client device 302. Upon receipt of data indicating a syntax or semantic error exists in a policy, the policies module 306 may take suitable action. For instance, the policies module 306 may inform a user of the client device 302 using a suitable error message.

The video conference provider 324 may include a policies storage module 332. When the policies I/O module 326 receives a new, modified, or deleted policy, the policy may be validated by the policies validator 330 and then stored in the policies storage module 332. The policies storage module 332 may be a memory device associated with the video conference provider 324. For instance, the policies storage module 332 may be a database, hard drive, or filesystem. The policies may be stored in any suitable fashion, for example, they may be stored as text, they may be compressed, or they may be stored as bytecode associated with the DSL. The policies storage module 332 may include the ability to query for policies. In one example, the policies I/O module 326 may query the policies storage module 332 for policies associated with a client device 302. In some examples, policies may be cached on the client device 302 and periodically refreshed from the policies storage module 332 on the video conference provider 324.

One or more modules making up the client device 302 and the video conference provider 324 described herein may include implementations of artificial intelligence or machine learning technologies (not shown) for remote management of videoconferencing applications. For example, a machine learning model may be trained using training data derived from a plurality of users using a plurality of client devices. The machine learning model may be a part of the video conference provider 324 or another communicatively coupled server and may send outputs in a suitable format to the client devices or other components of the video conference provider 324. In one example, the policies module 306 may store the actions of a user of the client device 302. The trained machine learning module can receive the stored actions of the user of the client device 302 and output one or more suggested policies that may be consistent with the training data and predicted to be desirable to the user. In another example, the policy engine 328 may receive predictions from the machine learning model, consistent with the training data, of which policies are likely to be satisfied under various conditions so that the policies engine 328 can optimize checking for the occurrence of conditions. For instance, conditions relating to chat channels may be more likely to occur for chat channels with large numbers of members or with particularly high volumes of message traffic. A machine learning model may provide indications of which conditions to preferentially check for occurrence to optimize the use of computing resources.

The machine learning model may be an ensemble of machine learning technologies. The machine learning model may include neural networks, gradient boosted machines, random forests, generalized linear models, and reinforcement models. However, any suitable machine learning model may be used according to different examples, such as deep convolutional neural networks ("CNNs"); a residual neural network ("Resnet"), or a recurrent neural network, e.g. long short-term memory ("LSTM") models or gated recurrent units ("GRUs") models, a three-dimensional CNN ("3DCNN"), a dynamic time warping ("DTW") technique, a hidden Markov model ("HMM"), a support vector machine (SVM), decision tree, random forest, etc., or combinations of one or more of such techniques—e.g., CNN-HMM or MCNN (Multi-Scale Convolutional Neural Network). Further, some examples may employ adversarial networks, such as generative adversarial networks ("GANs"), or may employ autoencoders ("AEs") in conjunction with machine learning models, such as AEGANs or variational AEGANS ("VAEGANs").

Figure 4:
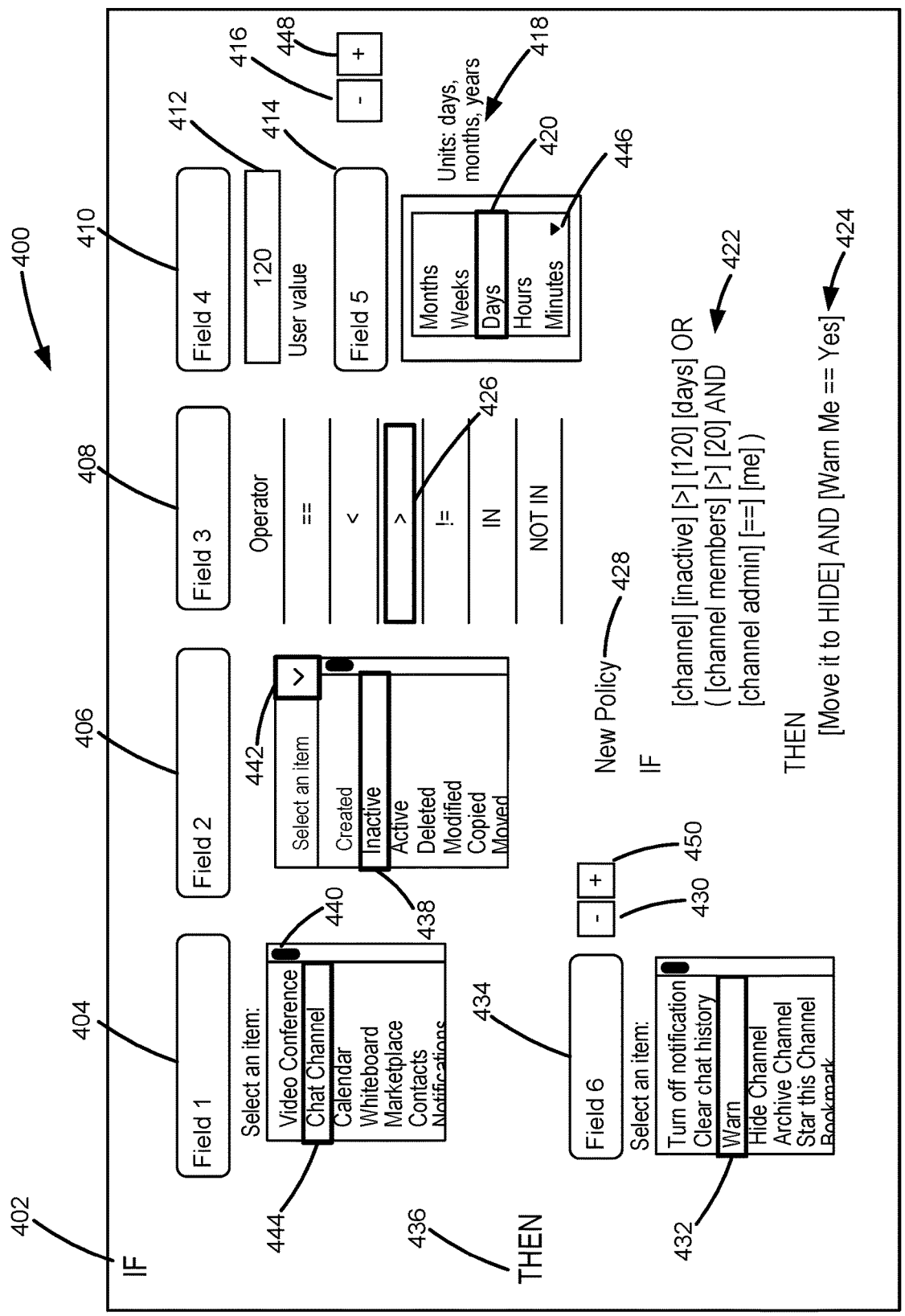
FIG. 4 shows an example policies editor for creating, viewing, updating, and deleting policies, according to an example herein.

Referring now to FIG. 4, in FIG. 4 an example policies editor 400 for creating, viewing, updating, and deleting policies is illustrated, according to an example herein. The policies editor 400 may be visible on a GUI 304 on a client device 302. The policies editor 400 may be a part of the policies module 306, but other configurations are possible. For instance, the policies editor 400 may be provided by the video conference provider 324 using a web server or the like. In that example, the user of the client device 302 may be able to edit policies independently of the client device 302. The example policies editor 400 illustrates one possible implementation for a policies editor, but other configurations are possible. For instance, policies may be edited using an API provided by the client device 302 or the video conference provider 324.

A policy may include one or more conditions and one or more actions to be taken upon the occurrence of said conditions. The conditions may include properties of the applications in the applications module 310 or other components of the client device 302. Properties of a given application or function may be determined based on data associated with the application or component. For example, data including the list of members of a chat channel may correspond to a property that represents the number of members in the channel. Data from an application or a component of the client device 302 may correspond to multiple properties. For example, data including the list of members of a chat channel may also correspond to a property that represents whether a particular user is in a given chat channel. Data may be exposed through an API of the client device 302 or other application. Data may also be available through system calls, external APIs or web applications, property files, system properties, volatile memory, or any other suitable location.

For example, a chat application 312 may include properties that can be based on data associated with the chat application 312. For instance, a chat application 312 may include a chat channel. A timestamp of the most recent message sent using a chat channel may be an example of data associated with the chat application 312 on which a property included in the condition of a policy can be based. The timestamp of the most recent message may correspond to an inactivity property in a condition, in which the period of time since the most recent message is used to determine the period of inactivity. Other examples of data associated with the chat application 312 may include chat channel messages and chat channel settings. Chat channel messages may include messages sent using the chat application 312 on a particular chat channel, including their content, timestamps, user data, and so on. Chat channel settings may include the settings of a particular chat channel included in chat application 312, including chat channel names, timestamps, customizations, and so on. The properties of the chat application 312 can be based on the data associated with the chat application 312 in various ways according to the implementation of the policies module 306. For example, the timestamp of the most recent message may correspond to a channel popularity property, an inactivity property, a day of the week property, or other suitable mapping.

As another example, a video meeting application 314 may include properties that can be based on data associated with the video meeting application 314. For instance, a video meeting application 314 may include a video meeting. A list of the participants in a video meeting may be an example of data on which a property included in the condition of a policy may be based. For example, the list of the participants in a video meeting may correspond to a participant count property in a condition. Other examples of data associated with the video meeting application 314 may include video meeting streams, video meeting transcripts, video meeting translations, and video meeting settings, among other possible data sources. For example, video meeting streams may include the content of in-progress video meetings or recorded video meetings, including audio, video, and other forms of data. Video meeting transcripts may include a transcription of the audio content of a particular video meeting generated by the video meeting application 314. Video meeting translations may include human or machine translations of a video stream or a video transcript of a particular meeting generated by the video meeting application 314. Video meeting settings may include participants, client settings, security settings, and so on of a particular video meeting included in the video meeting application 314. The properties of the video meeting application 314 can be based on the data associated with the video meeting application 314 in various ways according to the implementation of the policies module 306. For example, the list of the participants in a video meeting may correspond to a participant count property, a property corresponding to a particular user in a video meeting, or other suitable mapping.

As another example, a calendar application 316 may include properties that can be based on data associated with the calendar application 316. For instance, a calendar application 316 may include a calendar. The number of meetings scheduled for a given day on a particular calendar may be an example of data on which a property included in the condition of a policy may be based. The number of meetings scheduled for a given day on a particular calendar may correspond to a meeting count property in a condition. Other examples of data associated with the calendar application 316 may include appointments, shared calendars, or calendar settings, among other possible sources. Appointment data of a calendar associated with a calendar application 316 may include the dates and times of appointments, participants, locations, time zones, and so on. Shared calendars which may be included in a calendar application 316 can include data from third-party calendar providers, calendars from other users of the video conference provider 324, public calendars, other calendars of the user, and so on. Calendar settings may include the settings of a particular calendar included in the calendar application 316, including calendar names, security settings, customizations, and so on. The properties of the calendar application 316 can be based on the data associated with the calendar application 316 in various ways according to the implementation of the policies module 306. For example, the number of meetings scheduled for a given day on a particular calendar may correspond to a meeting count property or other suitable mapping.

In these examples, the data may correspond to a property making up a condition. The data need not be quantifiable. For example, the name of a chat channel, the internet protocol ("IP") address of a video conference participant, or the day of the week from a calendar are properties that may be the constituent elements of conditions. Policies are not limited to these example applications. Policies may be created for any component of the client device 302 for which data is available and a corresponding property can be implemented. Likewise, actions need not necessarily be associated with the applications in the conditions. For instance, a policy may contain a condition relating to a chat application 312 and an action relating to a calendar application 316. In that example, the action may specify additional context needed to link a subject of the calendar application 316 with the subject of the chat application 312.

Compound conditions are also possible. A compound condition is one composed of multiple conditions. Compound conditions can be composed using Boolean operators. For example, a policy may include a compound condition made up of a first condition "and"-ed with a second condition. In this example, the condition will have occurred only when the first condition and the second condition have both occurred. In contrast, a policy may be made up of a first condition "or"-ed with a second condition. In that example, the condition will have occurred if either the first condition or the second condition have occurred. Other Boolean operators, including "inclusive or", "exclusive or", "not", and others may be used to construct compound conditionals.

An example policy can include a condition with properties from more than one application, non-quantifiable properties, and a compound condition. The example policy may include the condition represented as "IF meeting host is ME AND attendees response to the calendar invite=NO." This condition may be satisfied if a scheduled meeting is added to a calendar provided by the client device 302, wherein the user of the client device 302 is the "host" of the scheduled video meeting and one or more invitees responds to the scheduled meeting with an indication that they will not attend. The example policy may include the action represented as 'THEN "text" "attendee123@apple.org is not coming" to "408111-2222" AND "email" "clarke@apple.org".' When the policies engine 328 determines that the condition is satisfied, the video conference provider 324 can cause the client device 302 or other component to send an SMS text message to the designated recipient or an email message to the designated recipient including details about the meeting and the invitee who cannot attend.

This example also illustrates dynamic policies, according to some embodiments of the present disclosure. For example, policies may be constructed that include variables or templates that may be populated by the rules engine 328 prior to dispatching commands or instructions to the client device 302 to cause the performance of one or more actions. For example, a policy action may contain variables that correspond to a property in the policy condition that may take on many values. For example, the condition may refer to one or more invitees and a variable in the action can be populated according to those invitees, among all possible invitees, for whom the conditions were satisfied. In the example given, the dynamic variables have been populated to refer to invitee "attendee123@apple.org."

Policies built up from conditions and actions may be represented using a variety of abstractions. For example, the policies engine 328, discussed above, can be configured to read plain text policies. In that example, policies may be internally represented as text using colloquial or formal written grammar. A condition may be written as "if some chat channel is inactive for more than 120 days." Alternatively, the policies may be represented according to a particular domain specific language (DSL) or expression language (EL). In that case, the same condition from the previous example might be written as "IF chat_channel.inactive>120.days" but any other DSL or EL may be used. Alternatively, the policies may be internally represented using program code from a suitable programming language, like Java, C#, or Python. In that case, the same condition from example the previous might be written as "startIf( ).chatChannel(INACTIVE).greaterThan(120, getTimeUnit(DAYS)).endIf( )". Other representation schemes are also possible. In some examples, a commercial business rules framework may be used to implement the policies engine 328, which may itself specify a particular DSL for policies.

Likewise, the actions may be made up of functions that can be performed on the applications of the client device 302, including the applications in the applications module 310. The client device 302 may have other functions, however. For instance, adjusting the volume of the client device 302 is an example of a function of the client device 302 not necessarily contained in an application. Compound actions are also possible. A compound action is made up of a plurality of actions. If the corresponding condition occurs, the actions making up the compound action may be performed. The actions may include instructions to operate the applications of the client device 302. As with conditions, actions may be represented as plain text, using some DSL or EL, using program code, or using some other representation.

Actions associated with the chat application 312, for example, may include sending a message, creating a notification about a past message, deleting a message, archiving a chat channel, or any other operation that may be performed with the chat application 312. Actions associated with a video meeting application 314 may include ending a video meeting, creating a notification during a meeting, adding a new participant, rescheduling the meeting, or any other operation that may be performed with the video meeting application 314. Actions associated with a calendar application 316 may include creating a new appointment or meeting, rescheduling a meeting, creating a notification, updating a shared calendar, or any other operation that may be performed with the calendar application 316. In these examples, the actions available may correspond to actions exposed using an API.

In some examples, policies are scoped to the user of the client device 302. Policy scope may refer to the applicability of a policy for a particular user of a client device 302. For example, policies scoped to a user of the client device may only apply to that single user. policies may be created with different scopes. The user of a client device 302 may be the videoconference application administrator or a member of a group managed by a videoconference application administrator. For instance, the videoconference application administrator of a corporate account associated with the video conference provider 324 may create policies with applicability to members of an organization. In another example, groups of users may be defined, and policies may be scoped to groups of users created by users or videoconference application administrators. Other scoping schemes are also possible.

Policy scope may be related to the administration of policies, including enabling or disabling certain policies. Policy scope can be administered at the user, group, or organization level. Administration of policy scope may include providing indications to the policies engine 328 of changes to policy scope. Changes to policy scope may be provided through, for example, the GUI 304 of the client device 302 or the API of the video conference provider 324. For example, the user of the client device 302 may enable or disable policies created by that user, but not policies created by an organization administrator. Likewise, a group administrator may enable/disable some or all policies scoped at the group level, but a user included in that group may be restricted from doing so. Other hierarchies of policy scoping may be possible.

The administration of policy scope may include functional scope. Functional scope refers to the applications or function of the client device 302 to which a policy applies. For instance, a policy scoped to a group may have potential applicability to both a chat application and a calendaring application. The group administrator may provide indications to the video conference provider 324 of desired changes in policy scope that restrict the applicability of the policy to only the chat application. Policy scoping and functional scoping may applied at any level of granularity. For example, organization-scoped policies can be selectively applied to certain groups within the organization or to certain functions used by certain groups within the organization. Policies thus applied to groups can be selectively applied to certain users within the group or to certain functions used by certain users within the group. Other examples of policy scoping may include, but are not limited to, policies scoped by times or dates, scoping by user role, or scoping by geographic location.

In some examples, the videoconference application administrator of a client device 302 may create a policy including conditions or actions including components found on a different client device. In other words, one client device 302 may create policies that depend on conditions found on a different client device 334 and 336. In other examples, one client device 302 may create policies that include actions to be performed on a different client device 334 and 336.

Several example policies may be associated with a video conferencing application and scoped to an organization. One example policy may include a condition that specifies that users not explicitly invited to a scheduled meeting attempt to join the meeting. The associated action may be a security action. For example, the video conferencing application may deny admittance of the non-invited users without some affirmative action by the creator of the meeting including, for example, manually clicking an "Admit" button. An administrator of an organization may create this example policy to enforce a security policy on all members of the organization. Another example of a policy that may be scoped at the organization level may include a condition represented as "meeting HAS Invitees>=50" and an action represented as '"MUTE" "UPON ENTRY" AND ("ONLY HOST CAN UNMUTE" OR "Attendee can request to unmute") AND "CHAT"="DISABLED".' This policy may automatically mute meeting attendees for meetings above a certain size, as well as enforcing other actions with security ramifications. Yet another example of a policy scoped at the organization level may be a policy that includes a condition that specifies that a video meeting recording has not been initiated and a video meeting has been ongoing for 5 or more minutes. The policy may include an action to remind the host of the meeting to manually initiate the recording. This policy may be related to organizational rules with legal ramifications since recording a video meeting may be a sensitive action. For instance, organizational rules may mandate compliance with federal and state law (e.g., Federal Trade Commission regulations, Health Insurance Portability and Accountability Act ("HIPAA"), etc.) or international regulations (e.g., General Data Protection Regulation ("GDPR")).

In some examples, the client device 302 may include pre-generated policies. The pre-generated policies may be created by the video conference provider 324, other videoconference application administrators, or developers of third-party applications, among other possibilities. The pre-generated policies may have one or more pre-selected conditions and one or more pre-selected actions action. The pre-generated policies may be provided to the videoconference application administrator of the client device 302 as an instructional aid or to accomplish routine management tasks. In some examples, it may be possible for users to make modifications to the pre-generated policies using the example policies editor 400, or other suitable method. For instance, a modified pre-generated policy may contain one ore more condition modifications and/or one or more action modifications. These are changes from the conditions and actions found in the pre-generated policy. In that case, the pre-generated policies are effectively new policies created by the videoconference application administrator of the client device 302.

The example policies editor 400 illustrates a new policy being created, viewed, or edited. The example policies editor 400 may be divided into a conditions section 402, labeled with "IF" and an actions section 436, labeled with "THEN." Turning first to the conditions section 402, several fields 404, 406, 408, 410, and 414 are shown. In this context, a field 404, 406, 408, 410, and 414 corresponds to an element of a condition. The policies editor 400 may be a dynamic form that changes in response to the values selected so that the policies have valid syntax and make semantic sense. For example, if a policy associated with a chat channel is created, then the dynamic form may be reconfigured to provide properties of a chat channel. The fields 404, 406, 408, 410, and 414 may directly correspond to elements of the DSL used to represent the policy. In some examples, the selections made may be translated into suitable DSL code.

For example, the first field 404, or Field 1, may specify an application from which properties may be selected. An application 444 may be selected. In this example, the application "Chat Channel" 444 is selected. The first field 404 selector may be a list box, drop down menu, radio selector, free text input, or any other suitable form widget for receiving input. The first field 404 selector may have additional controls 440. For example, if the selector is a single select list box, then there might be a scroll bar control.

Once a selection is made in the first field 404, the example policy editor 400 may reconfigure the available selections on the basis of syntactic validity and semantic sense. In the second field 406, Field 2, options may be shown that correspond to properties of the application selected in the first field 404. For example, if the application "Chat Channel" 444 was selected, then the second field may display options corresponding to properties of a chat channel, for example, "Created," "Active," "Inactive," and so on. A user may select one of these properties for the second field. For instance, "Inactive" 438 is selected in this example. The second field 406 selector may be a list box, drop down menu, radio selector, free text input, or any other suitable form widget for receiving input. The second field 406 selector may have additional controls 442. For example, if the selector is a drop-down menu, then there might be a drop-down button.

Once a selection is made in the second field 406, the example policy editor 400 may reconfigure the available selections on the basis of syntactic validity and semantic sense. In the third field 408, Field 3, options may be shown that correspond to comparisons that may be made against the selected application 444 and property 438 from the previous two fields 404, 406. For instance, the operator ">" 426 may be selected to indicate "greater than some numerical quantity." The comparisons may include a "double equal" operator that may have different meanings according to different implementations. For example, it may correspond to exact equality for integers, but only approximate equality for floating point comparisons. The comparisons may include "IN" or "NOT IN" operators corresponding to list or array operations. For example, the "IN" operator may require that the operand (the object of the operator) be included among the members of a specified array. The array may be designated with a tool (not shown) that allows for the selection of array members. For example, an array including a plurality of numerical values may be specified. The operators in the third field 408 may also correspond to lexicographical comparisons, or may include other sets of operators, for example, string matching operators. The third field 408 selector may be a list box, drop down menu, radio selector, free text input, or any other suitable form widget for receiving input.

Once a selection is made in the third field 408, the example policy editor 400 may reconfigure the available selections on the basis of syntactic validity and semantic sense. In the fourth field 410, Field 4, an input box 412 may be provided that corresponds to the numerical comparison operator 426 selected in the third field 408. In this example, the input box 412 has received a value, 120, from an input device associated with the client device 302. The input box 412 may provide some input validation, for example, only allowing the user to input numbers when preceded by a numerical comparison operator 426. The fourth field 410 selector may be a list box, drop down menu, radio selector, free text input, or any other suitable form widget for receiving input.

Once a selection is made in the fourth field 410, the example policy editor 400 may reconfigure the available selections on the basis of syntactic validity and semantic sense. In the fifth field 414, Field 5, a list box may be shown that provides selections that correspond to units that accord with the numerical input of the fourth field 410. For instance, the time unit "Days" 420 may be selected to indicate the comparison ">" 426 to be made against 120 days. The fifth field 414 selector may be a list box, drop down menu, radio selector, free text input, or any other suitable form widget for receiving input. The list box widget may contain additional controls like an arrow 446 indicating that more choices are available. The GUI 304 of the example policies editor 400 may include in-line documentation 418 describing the available options at each stage of policy construction. The example policies editor 400 may contain buttons 416 and 448 that indicate the addition or deletion of additional conditions in a compound condition. For instance, pushing the "+" button 448 may correspond to adding a new condition to a compound condition. Pushing the "−" button 416 may correspond to deleting a condition that has already been created from a compound condition.

Turning next to the actions section 436, one field 434 is shown. In this context, a field 434 corresponds to an element of an action. As with the conditions section 402, the policies editor 400 may be a dynamic form that changes in response to the values selected so that the policies have valid syntax and make semantic sense. For example, if an action associated with a chat channel is created, then the dynamic form may be reconfigured to provide actions that may be taken in the context of a chat channel.

For example, the sixth field 434, or Field 6, may include several verbs or actions. A verb or action may be selected. In this example, the verb "Warn" 432 is selected. The sixth field 434 selector may be a list box, drop down menu, radio selector, free text input, or any other suitable form widget for receiving input. Other actions included in the sixth field 434 may include, for example, actions that may be performed on, by, or using a chat channel on the client device 302. For example, the verbs may include "Hide Channel" or "Archive Channel," which are actions that could be performed by a user of the client device 302 on a chat channel. Another action that may be included in the sixth field 434, or other field, is a "Star this Channel" action. This action may cause one or more indications to be shown by the client device 302 that indicate that a particular chat channel is a high priority. For example, a starred channel may be pinned to the top of a channel list as shown on the GUI 304 of the client device 302. Although not shown in the illustration of the example policies editor 400, the sixth field may be followed by additional fields that provide additional context to the action to be taken. For instance, a seventh field might indicate which user(s) to warn. The example policy editor 400 may also reconfigure the available selections on the basis of syntactic and semantic sense. As with the conditions section 402, the example policies editor 400 may contain buttons 430, 450 that indicate the addition or deletion of additional actions in a compound action. For instance, pushing the "+" button 450 may correspond to adding a new action to a compound action. Pushing the "−" button 430 may correspond to deleting an action that has already been created from a compound action.

In this example illustration of a policies editor 400, the selections shown in the conditions section 402 correspond to a condition that means "if a chat channel is inactive for more than 120 days." The actions section 436 corresponds to an action that means "warn the user." The example policies editor 400 may include an indication 428 of the mode of the policies editor 400. For example, "New Policy" 428 might correspond to a new policy creation mode. In some examples, the indication 428 may also include an indication of the validity of a policy. As mentioned above, the policies module 306 may perform some syntax and semantic validity checking. Validity may be indicated by way of an error message, colored indicator, or any other suitable method.

The example policies editor 400 may display the policy being edited while policy creation is in progress. For instance, the compound condition 422 of the policy being edited may be shown along with the compound action 424 making up the new policy. Compound conditions may include internal conditions joined by Boolean operators. Likewise, Compound actions may include internal actions joined by Boolean operators. In this example, the policy containing the compound condition 422 includes a first condition compounded with another internal compound condition using Boolean operators. In the first condition of the compound condition 422, the condition requires that a specified chat channel is inactive for greater than 120 days. This condition is logically "or"-ed with a second, internal condition that is itself a compound condition that contains two logically "and"-ed conditions. The internal compound condition may be indicated with parentheses. The "and"-ed condition requires both that the specified chat channel has more than 20 members and that the specified channel has as a member which is the user of the client device 302. The user of the client device 302 may also be a videoconferencing application administrator. The compound condition 422 may occur if either the first condition occurs or the second, internal compound condition occurs. Likewise, the compound action is logically "and"-ed together. If the compound condition 422 occurs, then the compound action 424 including both moving the specified chat channel to a hidden status and warning the user of the client device 302 will be performed.

In some examples, the policies editor 400 may be used to view existing policies. The policies editor 400 may include the ability to enabled or disable policies. The policies editor 400 may also include an indication of whether a policy is enabled or disabled (not shown). For instance, the policies editor 400 may display a green circle indicating that a particular policy is enabled and a grey circle indicating that a particular policy is disabled. The policies editor 400 may display a single policy at a time, or it may display multiple policies concurrently. The list of multiple policies may also display a visual indication of whether or not the policy is currently enabled or disabled. These descriptions of an example user interface feature are just examples. One skilled in the art will recognize that many variations are possible. For example, the indication associated with enabled or disabled policies may be any color or shape, according to the look and feel of the particular user interface and may vary across implementations.

Although the example policies editor 400 is illustrated with a particular example policy under creation, it should be stressed that this example is in no way limiting. Many other editor properties are possible including, but not limited to, different applications, functions, fields, operators, widgets, conditions, actions, units, and so on.

For example, the client device 302 or video conference provider 324 may include a utility that can allow a user to export policies in a form suitable for execution as a script. For instance, the video conference provider 324 may include a utility that allows an organization administrator to export organization-scoped policies as a script that can be executed independently of the video conference provider 324. For example, the script may be a bash, PowerShell, or batch script, in addition to other scripting languages or custom execution paradigms. In another example, the client device 302 may include a utility that allows the user of the client device 302 to export user-scoped policies to a script that may be executed independently of the client device 302. The exported script may include instructions to execute code that will cause commands to be sent to the API of the video conference provider 324 to cause conditions to be evaluated or actions to be taken. The encapsulation of policies, including conditions and actions, in a script may allow users and administrators to remotely manage videoconferencing applications.

Figure 5:
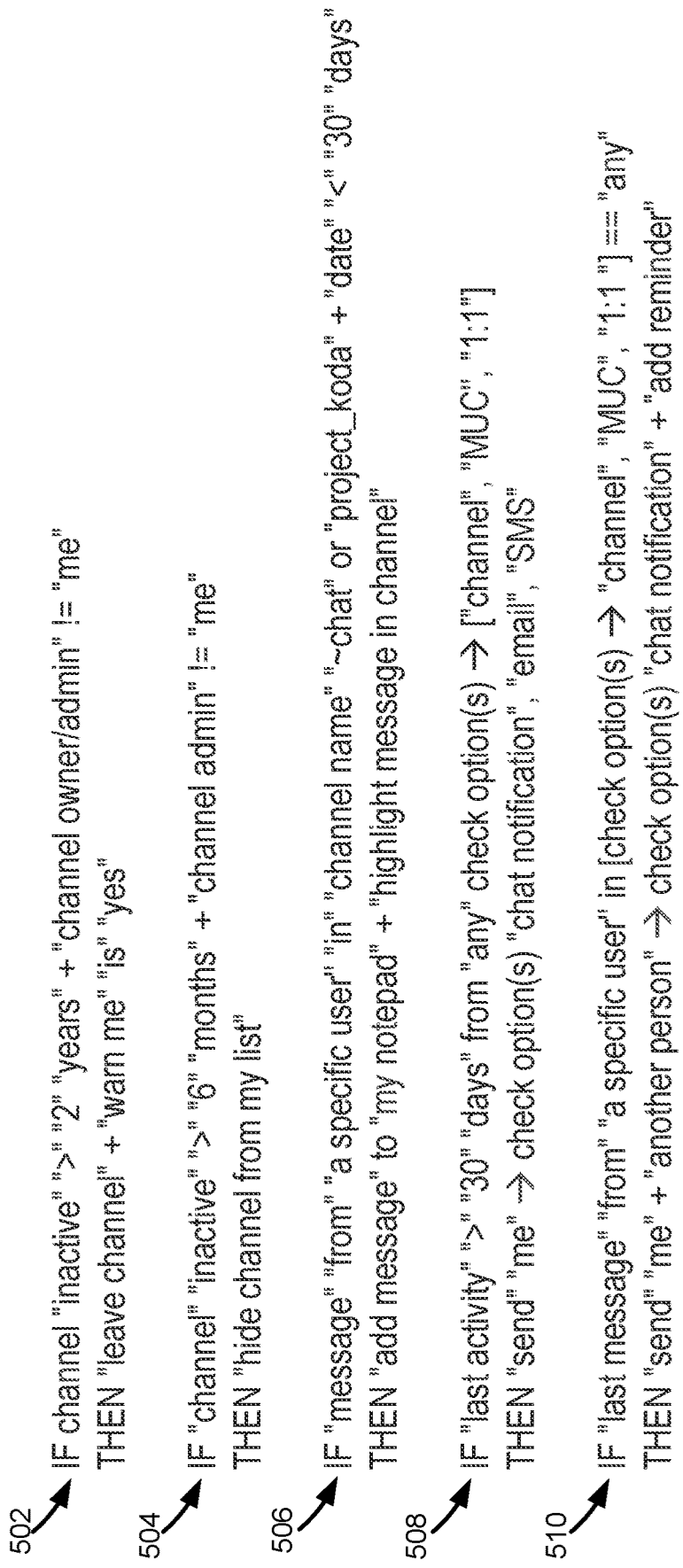
FIG. 5 shows an example set of policies as may be displayed in an example policies editor, according to an example herein.

Referring now to FIG. 5, in FIG. 5 an example set of policies 500 as may be displayed in an example policies editor 400 is illustrated, according to an example herein. These example policies 500 are intended to be illustrative of the policies that may be created in association with a chat application 312, but policies associated with any other component of the client device are possible. The example set of policies 500 might be found, for example, in the "New Policy" 428 section of the example policies editor 400, but other presentations are possible. The example set of policies 500 may be created by a videoconferencing application administrator who may also be the user of a client device 302.

In policy 502, the policy specifies that if the policies engine 328 determines that a specified chat channel is inactive for more than 2 years and the channel owner/admin is not the user of the client device 302, then the policies engine 328 should send a message to the policies event processor 308 requiring that it should remove the user of the client device 302 from the specified chat channel and warn the user of the client device. This example includes both a compound condition and a compound action, and examples of non-numeric properties.

In policy 504, the policy specifies that if a specified chat channel is inactive for more than 6 months and the channel administrator is not the user of the specified chat channel, then the policies engine 328 should send a message to the policies event processor 308 requiring that it should hide the channel from the list of chat channels of the user of the client device 302. This example includes a compound condition.

In policy 506, the policy specifies that if the policies engine 328 determines that a message from a specified user in a chat channel with channel name containing the string "chat" or "Chat" and the date the message was sent is less than 30 days old, then the policies engine 328 should send a message to the policies event processor 308 requiring that it should add the message to the notepad application of the user's client device and highlight the message in the chat channel it was contained in. This policy illustrates the use of a string-matching pattern in the DSL used to specify the policy. For example, the policy uses "channel name ~chat" to indicate that the policy applies to chat channels with names containing the string "chat." Other string-matching operations are possible. For example, string matching using regular expressions may be possible.

In policy 508, the policy specifies that if the policies engine 328 determines that if the last activity detected from any team chat channel, multi-user chat channel, or one-on-one chat channel is greater than 30 days ago, then the policies engine 328 should send a message to the policies event processor 308 requiring that it should send the user of the client device 302 either a notification via chat, email, or Short Message Service ("SMS"). This policy illustrates a condition on a chat application with actions relating to other applications of the client device 302 including, for example, an email application or SMS application. This policy also illustrations a condition that contains an array of possible values that a property can have.

In policy 510, the policy specifies that if the policies engine 328 determines that any message from a specific user is detected in any team chat channel, multi-user chat channel, or one-on-one chat channel, then the policies engine 328 should send a message to the policies event processor 308 requiring that it should send the user of the client device 302 and another specified user either a notification via chat, email, or SMS. This policy illustrates a compound action including a selection from an array of possible actions.

In these examples, where multiple polices have been created by the video meeting application administrator, the policies engine 328 may include a component that periodically checks for the occurrence of conditions. In this example, the policies engine 328 may iterate over the conditions contained in policies 502, 504, 506, 508, and 510 and check for the occurrence of those conditions according to a pre-determined order. In another example, the policies engine 328 may include an event-based framework, in which conditions including properties from particular applications are checked for occurrence upon the triggering of particular events. For instance, reassignment of the chat channel administrator role may trigger the evaluation of the conditions in policies 502 and 504, but not 506, 508, and 510, since there is no term including "channel admin" in those policies. Other policies engine 328 implementations are possible as well.

Figure 6:
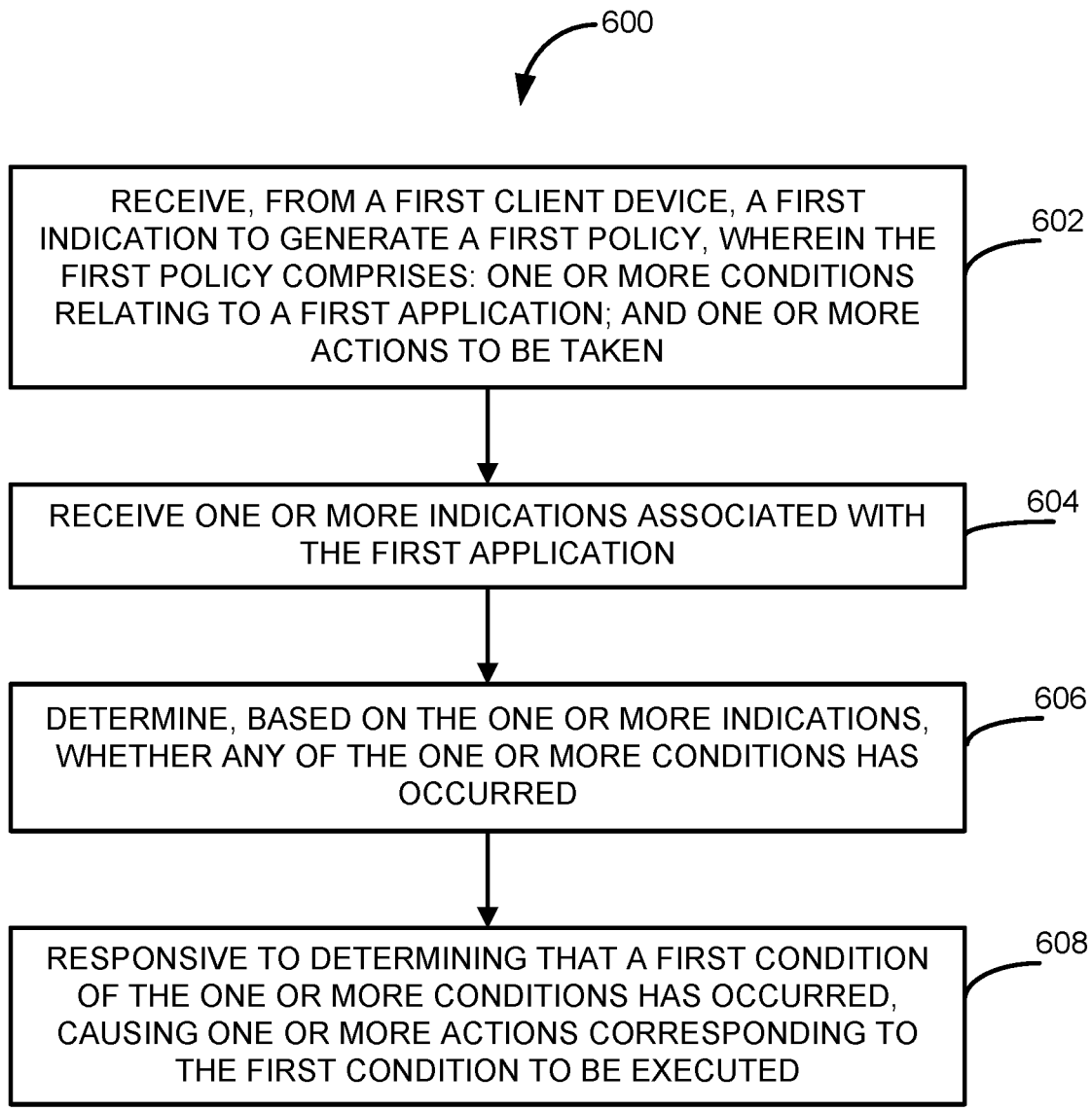
FIG. 6 shows a flowchart of an example method for remote management of videoconferencing applications.

Referring now to FIG. 6, FIG. 6 shows a flowchart of an example method 600 for remote management of videoconferencing applications is shown. The description of the method 600 in FIG. 6 will be made with reference to FIGS. 3-5, however any suitable system according to this disclosure may be used, such as the example systems 100 and 200, shown in FIGS. 1 and 2.

It should be appreciated that method 600 provides a particular method for remote management of videoconferencing applications. Other sequences of operations may also be performed according to alternative examples. For example, alternative examples of the present disclosure may perform the steps outlined above in a different order. Moreover, the individual operations illustrated by method 600 may include multiple sub-operations that may be performed in various sequences as appropriate to the individual operation. Furthermore, additional operations may be added or removed depending on the particular applications. Further, the operations described in method 600 may be performed by different devices. For instance, an application may transmit directly to a video conference provider and/or via a client software. One of ordinary skill in the art would recognize many variations, modifications, and alternatives.

The method 600 may include block 602. At block 602, method 600 involves receiving, from a first client device, a first indication to generate a first policy, wherein the first policy comprises one or more conditions relating to a first application and one or more actions to be taken. For example, a videoconferencing application administrator of the client device 302 may generate a new policy using the example policies editor 400 or the like. As discussed above, the new policy may include one or more conditions and one or more actions. The conditions may be made up of properties, which correspond to data from the applications and other components of the client device 302. The actions may be made up instructions to perform functions associated with the applications and other operations on the client device 302.

The method 600 may include block 604. At block 604, method 600 involves receiving one or more indications associated with the first application. Continuing the example, once the policy has been created and received by the video conference provider 324, the client device 302 may transmit application data to the video conference provider 324 which correspond to data from applications and other components of the client device 302. The video conference provider 324 may receive data from a plurality of client devices 302, 334, and 336 and other sources of data communicatively coupled with the video conference provider 324.

The method 600 may include block 606. At block 606, method 600 involves determining, based on the one or more indications, whether any of the one or more conditions has occurred. Continuing the example, the policies engine 328 can receive the data from applications and other components of the client devices 302, 334, and 336 or video conference provider 324 which correspond to the properties found in the conditions. The policies engine 328 may then, according to a suitable procedure, iterate through the conditions stored in the policies storage module 332 and determine if any of the conditions have occurred. Alternatively, the policies engine 328 may use an event-based framework to determine which conditions to check, or another procedure may be used.

The method 600 may include block 608. At block 608, method 600 involves responsive to determining that a first condition of the one or more conditions has occurred, causing one or more actions corresponding to the first condition to be executed. Continuing the example, upon a determination that a condition has occurred, the policies engine 328 may transmit data to the client device 302 indicating that a condition has been met and than one or more actions may be performed. The data may be sent to the policies event processor 308 for dispatch to the applications module 310 or other component of the client device 302. Alternatively, the policies engine may transmit, via the policies I/O module 326, data to other client devices 334 and 336 to cause actions therein.

Figure 7:
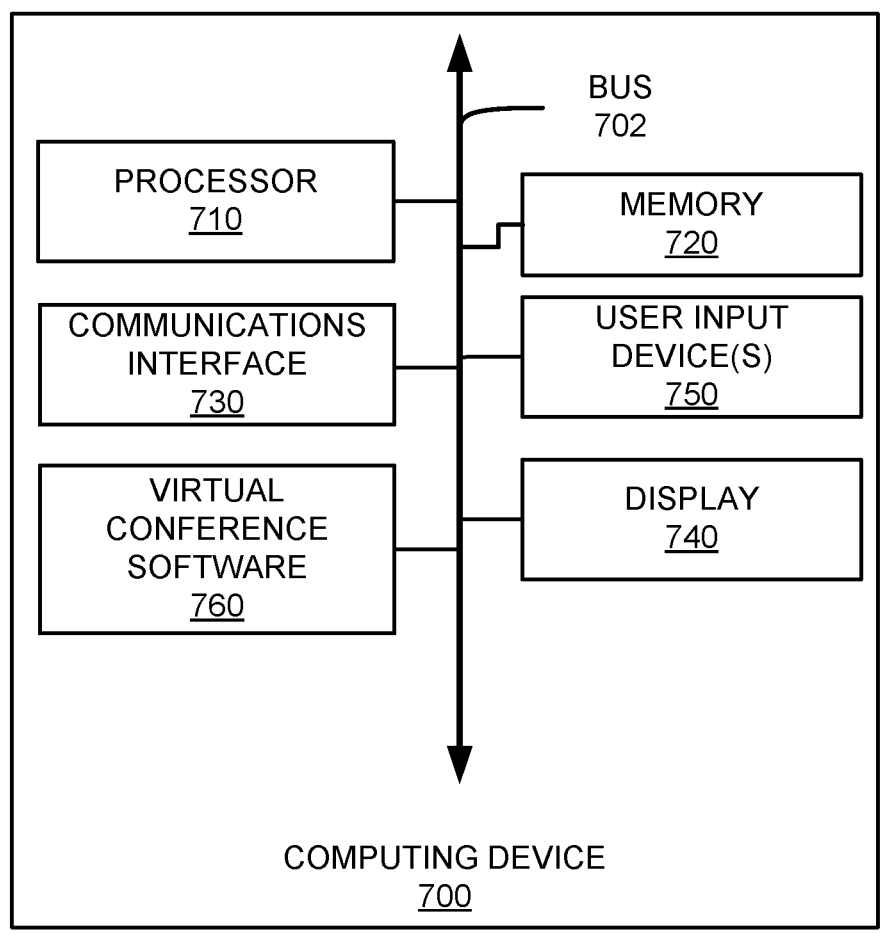
FIG. 7 shows an example computing device suitable for use in example systems or methods for remote management of videoconferencing applications according to this disclosure.

Referring now to FIG. 7, FIG. 7 shows an example computing device 700 suitable for use in example systems or methods for remote management of videoconferencing applications according to this disclosure. The example computing device 700 includes a processor 710 which is in communication with the memory 720 and other components of the computing device 700 using one or more communications buses 702. The processor 710 is configured to execute processor-executable instructions stored in the memory 720 to perform one or more methods for ad hoc client audio device support for virtual conferences according to different examples, such as part or all of the example method 600 described above with respect to FIGS. 3-5. The computing device 700, in this example, also includes one or more user input devices 750, such as a keyboard, mouse, touchscreen, microphone, etc., to accept user input. The computing device 700 also includes a display 740 to provide visual output to a user.

In addition, the computing device 700 includes a virtual conferencing application 760 to enable a user to join and participate in one or more virtual spaces or in one or more conferences, such as a conventional conference or webinar, by receiving multimedia streams from a virtual conference provider, sending multimedia streams to the virtual conference provider, joining and leaving breakout rooms, creating video conference expos, etc., such as described throughout this disclosure, etc.

The computing device 700 also includes a communications interface 730. In some examples, the communications interface 730 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method, comprising: receiving, from a first client device, a first indication to generate a first policy, wherein the first policy comprises: one or more conditions relating to a first application; and one or more actions to be taken; receiving one or more indications associated with the first application; determining, based on the one or more indications, whether any of the one or more conditions has occurred; and responsive to determining that a first condition of the one or more conditions has occurred, causing one or more actions corresponding to the first condition to be executed.

Example 2 is the method of example(s) 1, wherein the one or more conditions comprise one or more properties associated with the first application.

Example 3 is the method of example(s) 1, wherein the one or more actions comprise instructions to operate one or more applications of the first client device.

Example 4 is the method of example(s) 1, wherein the one or more indications comprise data derived from one or more operations of a virtual conference provider comprising a plurality of client devices.

Example 5 is the method of example(s) 4, wherein the first client device comprises the first application, and further comprising: receiving, from a second client device, a second indication to generate a second policy, wherein the second policy comprises the one or more conditions relating to the first application.

Example 6 is the method of example(s) 4, wherein a second client device comprises a second application, and further comprising: responsive to determining that the first condition of the one or more conditions has occurred, causing the one or more actions corresponding to the first condition to be executed, wherein the one or more actions comprise instructions to operate the second application of the second client device.

Example 7 is the method of example(s) 3, wherein the first application comprises a chat application, and further comprising: establishing, by a video conference provider, a first chat channel for exchanging chat messages between a plurality of client devices; and receiving, from the first chat channel, data comprising: one or more messages; and one or more channel settings, wherein: the one or more conditions relating to the first application comprise one or more properties associated with the first chat channel and the one or more properties correspond to the data; and the instructions to operate the one or more applications of the first client device comprise instructions to operate on the first chat channel.

Example 8 is the method of example(s) 3, wherein the first application comprises a video meeting application, and further comprising: establishing, by a video conference provider, a first virtual meeting between a plurality of client devices; and receiving, from the first virtual meeting, data comprising: one or more video meeting streams; one or more video meeting transcripts; and one or more video meeting settings, wherein: the one or more conditions relating to the first application comprise one or more properties associated with the first virtual meeting and the one or more properties correspond to the data; and the instructions to operate the one or more applications of the first client device comprise instructions to operate on the first virtual meeting.

Example 9 is the method of example(s) 3, wherein the first client device comprises a calendar application, and further comprising: establishing, by a video conference provider, a first calendar; and receiving, from the first calendar, data comprising: one or more appointments; one or more shared calendars; and one or more calendar settings, wherein: the one or more conditions relating to the first application comprise one or more properties associated with the first calendar and the one or more properties correspond to the data; and the instructions to operate the one or more applications of the first client device comprise instructions to operate on the first calendar.

Example 10 is the method of example(s) 1, further comprising: determining, from the first policy, if the first policy is syntactically valid; determining, from the first policy, if the first policy is semantically valid; and transmitting, to the first client device, the determination of the syntactic validity of the first policy and the determination of the semantic validity of the first policy.

Example 11 is a system comprising: one or more processors configured to: receive, from a first client device, a first indication to generate a first policy, wherein the first policy comprises: one or more conditions relate to a first application; and one or more actions to be taken receive one or more indications associated with the first application; determine, based on the one or more indications, whether any of the one or more conditions has occurred; and responsive to determine that a first condition of the one or more conditions has occurred, causing one or more actions corresponding to the first condition to be executed.

Example 12 is the system of example(s) 11, wherein the one or more conditions are based on one or more properties associated with the first application.

Example 13 is the system of example(s) 11, wherein the one or more actions comprise instructions to operate one or more applications of the first client device.

Example 14 is the system of example(s) 13, wherein the first application comprises a chat application, and further comprising: establishing, by a video conference provider, a first chat channel for exchanging chat messages between a plurality of client devices; and receiving, from the first chat channel, data comprising: one or more messages; and one or more channel settings, wherein: the one or more conditions relating to the first application comprise one or more properties associated with the first chat channel and the one or more properties correspond to the data; and the instructions to operate the one or more applications of the first client device comprise instructions to operate on the first chat channel.

Example 15 is the system of example(s) 13, wherein the first application comprises a video meeting application, and further comprising: establishing, by a video conference provider, a first virtual meeting between a plurality of client devices; and receiving, from the first virtual meeting, data comprising: one or more video meeting streams one or more video meeting transcripts; and one or more video meeting settings, wherein: the one or more conditions relating to the first application comprise one or more properties associated with the first virtual meeting and the one or more properties correspond to the data; and the instructions to operate the one or more applications of the first client device comprise instructions to operate on the first virtual meeting.

Example 16 is the system of example(s) 13, wherein the first client device comprises a calendar application, and further comprising: establishing, by a video conference provider, a first calendar; and receiving, from the first calendar, data comprising: one or more appointments one or more shared calendars; and one or more calendar settings, wherein: the one or more conditions relating to the first application comprise one or more properties associated with the first calendar and the one or more properties correspond to the data; and the instructions to operate the one or more applications of the first client device comprise instructions to operate on the first calendar.

Example 17 is a non-transitory computer-readable medium storing a set of instructions, the set of instructions comprising: one or more instructions that, when executed by one or more processors of a device, cause the device to: receive, from a first client device, a first indication to generate a first policy, wherein the first policy comprises: one or more conditions relate to a first application; and one or more actions to be taken receive one or more indications associated with the first application; determine, based on the one or more indications, whether any of the one or more conditions has occurred; and responsive to determine that a first condition of the one or more conditions has occurred, causing the one or more actions corresponding to the first condition to be executed.

Example 18 is the non-transitory computer-readable medium of example(s) 17, wherein the one or more conditions are based on one or more properties associated with the first application.

Example 19 is the non-transitory computer-readable medium of example(s) 17, wherein the one or more actions comprise instructions to operate one or more applications of the first client device.

Example 20 is the non-transitory computer-readable medium of example(s) 19, wherein the first application comprises a chat application, and further comprising: establishing, by a video conference provider, a first chat channel for exchanging chat messages between a plurality of client devices; and receiving, from the first chat channel, data comprising: one or more messages; and one or more channel settings, wherein: the one or more conditions relating to the first application comprise one or more properties associated with the first chat channel and the one or more properties correspond to the data; and the instructions to operate the one or more applications of the first client device comprise instructions to operate on the first chat channel.

That which is claimed is:

1. A method, comprising:
receiving, from a first client device, a first indication to generate a first policy, wherein the first policy comprises:
one or more conditions relating to a first application; and
one or more actions to be taken;
receiving one or more indications associated with the first application;
determining, based on the one or more indications, whether any of the one or more conditions has occurred; and
responsive to determining that a first condition of the one or more conditions has occurred, causing one or more first actions corresponding to the first condition to be executed.

2. The method of claim 1, wherein the one or more conditions comprise one or more properties associated with the first application.

3. The method of claim 1, wherein the one or more actions comprise instructions to operate one or more applications of the first client device.

4. The method of claim 1, wherein the one or more indications comprise data derived from one or more operations of a virtual conference provider comprising a plurality of client devices.

5. The method of claim 4, wherein the first client device comprises the first application, and further comprising:
receiving, from a second client device, a second indication to generate a second policy, wherein the second policy comprises the one or more conditions relating to the first application.

6. The method of claim 4, wherein a second client device comprises a second application, and further comprising:
responsive to determining that the first condition of the one or more conditions has occurred, causing the one or more first actions corresponding to the first condition to be executed, wherein the one or more first actions comprise instructions to operate the second application of the second client device.

7. The method of claim 3, wherein the first application comprises a chat application, and further comprising:
establishing, by a video conference provider, a first chat channel for exchanging chat messages between a plurality of client devices; and
receiving, from the first chat channel, data comprising:
one or more messages; and
one or more channel settings, wherein:
the one or more conditions relating to the first application comprise one or more properties associated with the first chat channel and the one or more properties correspond to the data; and
the instructions to operate the one or more applications of the first client device comprise instructions to operate on the first chat channel.

8. The method of claim 3, wherein the first application comprises a video meeting application, and further comprising:
establishing, by a video conference provider, a first virtual meeting between a plurality of client devices; and
receiving, from the first virtual meeting, data comprising:
one or more video meeting streams;
one or more video meeting transcripts; and
one or more video meeting settings, wherein:
the one or more conditions relating to the first application comprise one or more properties associated with the first virtual meeting and the one or more properties correspond to the data; and
the instructions to operate the one or more applications of the first client device comprise instructions to operate on the first virtual meeting.

9. The method of claim 3, wherein the first client device comprises a calendar application, and further comprising:
establishing, by a video conference provider, a first calendar; and
receiving, from the first calendar, data comprising:
one or more appointments;
one or more shared calendars; and
one or more calendar settings, wherein:
the one or more conditions relating to the first application comprise one or more properties associated with the first calendar and the one or more properties correspond to the data; and
the instructions to operate the one or more applications of the first client device comprise instructions to operate on the first calendar.

10. The method of claim 1, further comprising:
determining, from the first policy, if the first policy is syntactically valid;
determining, from the first policy, if the first policy is semantically valid; and
transmitting, to the first client device, the determination of the syntactic validity of the first policy and the determination of the semantic validity of the first policy.

11. A system comprising:
one or more processors configured to:
receive, from a first client device, a first indication to generate a first policy, wherein the first policy comprises:
one or more conditions relate to a first application; and
one or more actions to be taken;
receive one or more indications associated with the first application;
determine, based on the one or more indications, whether any of the one or more conditions has occurred; and
responsive to determine that a first condition of the one or more conditions has occurred, cause one or more first actions corresponding to the first condition to be executed.

12. The system of claim 11, wherein the one or more conditions are based on one or more properties associated with the first application.

13. The system of claim 11, wherein the one or more actions comprise instructions to operate one or more applications of the first client device.

14. The system of claim 13, wherein the first application comprises a chat application, and the one or more processors are further configured to:
establish, by a video conference provider, a first chat channel for exchanging chat messages between a plurality of client devices; and
receive, from the first chat channel, data comprising:
one or more messages; and
one or more channel settings, wherein:
the one or more conditions relating to the first application comprise one or more properties associated with the first chat channel and the one or more properties correspond to the data; and
the instructions to operate the one or more applications of the first client device comprise instructions to operate on the first chat channel.

15. The system of claim 13, wherein the first application comprises a video meeting application, and the one or more processors are further configured to:
- establish, by a video conference provider, a first virtual meeting between a plurality of client devices; and
- receive, from the first virtual meeting, data comprising:
  - one or more video meeting streams
  - one or more video meeting transcripts; and
  - one or more video meeting settings, wherein:
- the one or more conditions relating to the first application comprise one or more properties associated with the first virtual meeting and the one or more properties correspond to the data; and
- the instructions to operate the one or more applications of the first client device comprise instructions to operate on the first virtual meeting.

16. The system of claim 13, wherein the first client device comprises a calendar application, and the one or more processors are further configured to:
- establish, by a video conference provider, a first calendar; and
- receive, from the first calendar, data comprising:
  - one or more appointments
  - one or more shared calendars; and
  - one or more calendar settings, wherein:
- the one or more conditions relating to the first application comprise one or more properties associated with the first calendar and the one or more properties correspond to the data; and
- the instructions to operate the one or more applications of the first client device comprise instructions to operate on the first calendar.

17. A non-transitory computer-readable medium storing a set of instructions, the set of instructions comprising:
- one or more instructions that, when executed by one or more processors of a device, cause the device to:
  - receive, from a first client device, a first indication to generate a first policy, wherein the first policy comprises:
    - one or more conditions relate to a first application; and
    - one or more actions to be taken;
  - receive one or more indications associated with the first application;
  - determine, based on the one or more indications, whether any of the one or more conditions has occurred; and
  - responsive to determine that a first condition of the one or more conditions has occurred, cause one or more first actions corresponding to the first condition to be executed.

18. The non-transitory computer-readable medium of claim 17, wherein the one or more conditions are based on one or more properties associated with the first application.

19. The non-transitory computer-readable medium of claim 17, wherein the one or more actions comprise instructions to operate one or more applications of the first client device.

20. The non-transitory computer-readable medium of claim 19, wherein the first application comprises a chat application, and further comprising additional instructions that, when executed by the one or more processors of the device, cause the device to:
- establish, by a video conference provider, a first chat channel for exchanging chat messages between a plurality of client devices; and
- receive, from the first chat channel, data comprising:
  - one or more messages; and
  - one or more channel settings, wherein:
- the one or more conditions relating to the first application comprise one or more properties associated with the first chat channel and the one or more properties correspond to the data; and
- the instructions to operate the one or more applications of the first client device comprise instructions to operate on the first chat channel.

* * * * *